United States Patent
Marchin et al.

(10) Patent No.: US 11,208,560 B2
(45) Date of Patent: Dec. 28, 2021

(54) SPHERICAL PARTICLES FILLED WITH COLOURING AGENTS

(71) Applicant: PYLOTE, Dremil-lafage (FR)

(72) Inventors: Loïc Marchin, Mons (FR); Marie-Laure Desse, Portet sur Garonne (FR)

(73) Assignee: PYLOTE, Dremil-lafage (FR)

( * ) Notice: Subject to any disclaimer, the term of this patent is extended or adjusted under 35 U.S.C. 154(b) by 20 days.

(21) Appl. No.: 15/774,547

(22) PCT Filed: Nov. 10, 2016

(86) PCT No.: PCT/FR2016/052936
§ 371 (c)(1),
(2) Date: May 8, 2018

(87) PCT Pub. No.: WO2017/081427
PCT Pub. Date: May 18, 2017

(65) Prior Publication Data
US 2019/0100657 A1   Apr. 4, 2019

(30) Foreign Application Priority Data

Nov. 12, 2015 (FR) .................................. 1560840

(51) Int. Cl.
| *C09C 3/12* | (2006.01) |
| *C09C 1/30* | (2006.01) |
| *C09C 1/40* | (2006.01) |
| *C09C 3/06* | (2006.01) |
| *C09C 3/00* | (2006.01) |
| *C09C 3/08* | (2006.01) |

(52) U.S. Cl.
CPC ............ *C09C 1/3045* (2013.01); *C09C 1/309* (2013.01); *C09C 1/3054* (2013.01); *C09C 1/3063* (2013.01); *C09C 1/407* (2013.01); *C09C 3/006* (2013.01); *C09C 3/063* (2013.01); *C09C 3/08* (2013.01); *C01P 2004/03* (2013.01); *C01P 2004/32* (2013.01); *C01P 2004/50* (2013.01); *C01P 2004/61* (2013.01); *C01P 2004/62* (2013.01); *C01P 2004/80* (2013.01); *C01P 2006/12* (2013.01); *C09C 1/3081* (2013.01); *C09C 3/12* (2013.01)

(58) Field of Classification Search
None
See application file for complete search history.

(56) References Cited

U.S. PATENT DOCUMENTS

| 6,074,629 | A | * | 6/2000 | Kostinko | ............ A61K 8/0204 424/49 |
| 6,074,754 | A | | 6/2000 | Jacobsen et al. | |
| 6,080,232 | A | | 6/2000 | Sperlich et al. | |
| 6,143,280 | A | * | 11/2000 | Pike | .................. A61K 8/02 106/482 |
| 6,808,768 | B2 | * | 10/2004 | Satou | .................. B41M 5/5218 428/304.4 |
| 7,799,126 | B2 | * | 9/2010 | Handrosch | .............. C04B 20/12 106/415 |
| 2003/0116758 | A1 | * | 6/2003 | Morii | ..................... C09D 11/32 252/582 |
| 2006/0002875 | A1 | | 1/2006 | Winkler et al. | |
| 2006/0150716 | A1 | | 7/2006 | Yoshioka et al. | |
| 2006/0251687 | A1 | * | 11/2006 | Lapidot | ................ A61K 9/1611 424/401 |
| 2012/0030826 | A1 | | 2/2012 | Sebern et al. | |
| 2013/0091637 | A1 | * | 4/2013 | Lischewski | .............. A61K 8/11 8/524 |

FOREIGN PATENT DOCUMENTS

| CN | 1046544 A | 10/1990 |
| CN | 1790007 A | 6/2001 |
| CN | 1745740 A | 3/2006 |
| EP | 0391226 B1 | 10/1990 |
| EP | 0 581 651 A2 | 2/1994 |
| EP | 0581651 | 2/1994 |
| JP | A 58-002233 | 1/1983 |
| JP | A 63-184056 | 7/1988 |
| JP | A 04-031311 | 2/1992 |
| JP | A 96-047273 | 2/1994 |
| JP | A 07-216256 | 8/1995 |
| JP | A 10-218609 | 8/1998 |
| JP | A 11-035312 | 2/1999 |
| JP | A 2000-159509 | 6/2000 |
| JP | A 2009-263155 | 11/2009 |
| JP | A 2010-535929 | 11/2010 |
| JP | A 2012-524014 | 10/2012 |
| JP | A 2012-528913 | 11/2012 |
| JP | A 2013-095888 | 5/2013 |
| KR | 10-2013-0113572 | 10/2013 |
| WO | WO 2009/022308 | 2/2009 |
| WO | WO 2015/170060 A1 | 11/2015 |
| WO | WO 2010/139746 | 12/2020 |

* cited by examiner

*Primary Examiner* — Sheeba Ahmed
(74) *Attorney, Agent, or Firm* — William E. Beaumont; Juneau & Mitchell PLLC

(57) ABSTRACT

The present invention relates to spherical, dense micrometre-sized particles comprising colourants. The invention also relates to a material comprising these particles intended for use in papermaking, paint, agri-food, cosmetics or pharmaceuticals. It also relates to the process for preparing these particles and their incorporation in a matrix.

17 Claims, 1 Drawing Sheet

SPHERICAL PARTICLES FILLED WITH COLOURING AGENTS

The present invention relates to spherical, dense micrometre-sized particles comprising colourants. The invention also relates to a material comprising these particles intended for use in papermaking, paint, agri-food, cosmetics or pharmaceuticals. It also relates to the process for preparing these particles and their incorporation in a matrix.

STATE OF THE ART FOR THE INVENTION

In the field of inks or more generally colouring intended for use in papermaking, paint, agri-food, cosmetics or pharmaceuticals it is normal practice to use organic or inorganic colourants (or colouring agents) which are organic compounds or their salts or else pigments.

The encapsulation of colourants, in particular organic compounds, in a particle imparts various advantages such as preserving the stability of the colourant regardless of the pH, avoiding chemical degradation of the colourant by the solvent or another constituent of the formulation, ability to use a colourant which is not normally water-soluble in water or prevent its uncontrolled migration or dispersion into the material in which it is incorporated, or in the case of ink the paper substrate.

Several existing encapsulation processes are described in the literature:

Mention may be made of encapsulation in a sub-micron-sized organic polymer capsule of 0.05-0.3 microns, as in U.S. Pat. No. 6,841,591 by Vincent et al., in the field of inks and paints. However, monomer residues or synthesis solvents originating from polymerisation may still be present and have an adverse effect on the application, in particular in agri-food or cosmetics. In addition to this, degradation resistance and the ability of these polymer capsules to retain colourant is not necessarily optimal.

The encapsulation of a colourant by impregnation/adsorption at the surface of porous silica microparticles with or without a coupling agent, as in U.S. Pat. No. 5,520,917 by Mitzuguchi et al., or the work of Ren et al., (Ren, Tie-Zhen, Yuan, Zhong-Yong, and Su, Bao-Lian. Encapsulation of direct blue dye into mesoporous silica-based materials. Colloids and Surfaces A: Physicochemical and Engineering Aspects, 2007, vol. 300, no 1, p. 79-87), has also been described, but the concentration of colourant in the porosity is limited and release may occur over time.

Finally, mention may be made of the encapsulation of a colourant in 1-2 micron capsules in one stage by sol-gel emulsion, as in U.S. Pat. No. 7,923,030 by Lapidot et al., but the process requires quantities of organic solvents, such as linear alkanes, cyclohexane or kerosene, which can denature the colourant and also render the process difficult to industrialise and/or use in the agri-food, cosmetics and pharmaceuticals fields. Because of the process used the quantity of colourants present in the capsules obtained is small.

US Patent application 2013/091637 by Lischewski et al. describes a process of encapsulating a water-soluble colourant in a silica "pigment" in one stage by spraying or drying by spraying with Buchi B290 equipment, in the form of spheres, with pigment release of less than 0.5%. The precursor solution is based on TEOS (tetraethoxysilane) with hydrolysis in water-alcohol medium, preferably catalysed with acetic acid and a colourant concentration of 0.03-0.15 g of colourant/g TEOS, that is 9% to 34% by mass of colourant in the final particle. The field of the invention mainly covers agri-food, pharmaceutical and cosmetic products.

In U.S. Pat. No. 8,168,095, Alberius et al. also describe a process for encapsulating a colourant in a silica capsule in one stage by spraying, in the form of spheres, with release of colourant by the capsule of between 0.5% and 5%. The precursor solution is based on TEOS (tetraethoxysilane) with hydrolysis in water-alcohol medium, preferably catalysed at a pH of 1.5-2.5 with hydrochloric acid and a colourant concentration from 0% to 25% by weight of colourant in the final particle. The field of the invention mainly covers detergents and cosmetics.

In general, in the materials field, it is normal practice to use particles to impart desired properties to a material, because the range of particles is very large, and they make it possible to obtain an equally large range of properties. The properties imparted to the material by nano- and/or microparticles are generally associated with the properties of the particles themselves, such as their morphological, structural and/or chemical properties in particular; the properties imparted to the material may also originate from agents incorporated within the particles.

Particles of spherical morphology are particularly useful in various fields. In particular it is known from the literature that particles of spherical morphology are particularly useful in colourimetry, because the more spherical the particles, the stronger the colour. The size range of the microspheres is also important in the case of inks. Thus suspension of spherical micrometre-sized particles of between 0.5 and 10 microns appears to be particularly useful for inks, because the smaller the diameters of the particles the more the particles will diffuse and will be easy to disperse.

Most of the particles in the prior art that are said to be spherical are however either aggregates of non-spherical particles, the aggregate itself having a form which approaches that of a sphere, or they have unsatisfactory sphericity. Various processes have been developed to optimise the sphericity of the particles synthesised. Most of these processes are optimised for particles of a single type, for example a chemical type (for example silica particles) or a morphology (for example porous particles). It should be noted that silica particles are already known for other functions, in particular as abrasive agents or rheological agents in ink, cosmetic or agri-food formulations.

It would therefore be useful to have particles having a high sphericity coefficient containing colourants in order to impart a colouring property to the particles and the matrices containing them.

The dispersion of particles in a matrix is also a known technique for imparting a property to the said matrix. For example, pigments may be dispersed in matrices to impart colour properties to them. The nature of the particles, their surface properties and optionally their coating need to be optimised to obtain a satisfactory dispersion in the matrix. Optimisation of the dispersibility of particles in the matrix will depend on both the nature of the particles and the nature of the matrix. It is important that the particles should be capable of being uniformly dispersed within the matrix so that the property sought for can be uniformly distributed within the whole of the volume of the matrix.

When the particles agglomerate in the matrix the sought-for properties are not imparted uniformly to the matrix and the result obtained is unsatisfactory. In the specific case of the use of submicron pigment particles having a strong theoretical colouring/opacifying capacity, their aggregation results in only the particles located at the surface of the aggregate interacting with light. It follows that all the particles located within the volume of the aggregate become ineffective from the point of view of the sought-for colouring property.

It would therefore be very useful to have new processes through which particles which can be dispersed satisfactorily in any matrix and thus provide the colouring property to the matrix in a uniform and fully effective way could be obtained.

In this context the Applicant has developed a simple process through which perfectly spherical micrometre-sized coloured particles of different chemical natures containing colourants can be prepared. Surprisingly the particles obtained by this process remain in the individualised state, regardless of their chemical nature, and do not form aggregates when either in the dry state or when dispersed in a matrix.

Through the process according to the invention it becomes possible to have a higher loading level of colourants than in conventional processes and in particular processes involving the impregnation of porous particles in post-treatment.

Through the process according to the invention it is possible to obtain micrometre-sized spherical particles loaded with colourants, with particle formation and the incorporation of colourants being concomitant.

SUMMARY OF THE INVENTION

The first object of the present invention is a set of particles characterised in that they are spherical, dense and micrometre-sized, and in that they comprise organic colourants. Usefully, the quantity of colourants in the particles according to the invention may be high. More specifically, the quantity of colourants may vary from 5 to 35%, preferably from 5 to 30%, and more particularly from 10 to 30% by mass in relation to the mass of the particles.

Another object of the invention is a material comprising a set of particles according to the invention and a matrix.

The invention also relates to a process for preparing a set of particles according to the invention.

The invention also relates to a process for preparing a material according to the invention comprising contacting a matrix with a set of particles according to the invention.

DETAILED DESCRIPTION OF THE INVENTION

Figure 1:
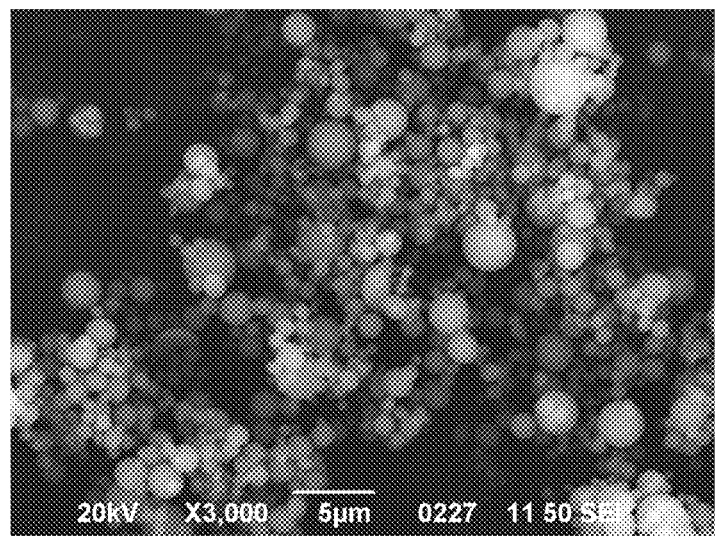
FIG. 1: SEM image of silica particles charged with colourant of Example 2—scale 5 µm—mean diameter 1.0 µm±0.5 µm, with a circularity coefficient of 0.95±0.15

The first object of the present invention is a set of particles, characterised in that the particles are spherical, dense and micrometre-sized, and in that they have incorporated colourants.

The particles according to the invention are spherical, that is to say they have a 3D sphericity coefficient or a 2D circularity coefficient of 0.75 or more. Preferably the sphericity coefficient is 0.8 or more, 0.85 or more, 0.9 or more, or else 0.95 or more. The 2D circularity coefficient may for example be calculated by measuring the aspect ratio using any suitable software from images, for example images obtained by microscopy, in particular scanning electron or transmission electron microscopy, of the particles. The circularity coefficient C of a particle in a 2D view is the ratio:

$$C = 4\pi \frac{Area}{Perimeter^2}.$$

For or a perfect circle this ratio has the value of 1. (Cavarretta, I., O'Sullivan, C., and Coop, M. R. Applying 2D shape analysis techniques to granular materials with 3D particle geometries. Powders and Grains 2009, 2009, vol. 1145, p. 833-836).

In one embodiment the invention relates to a set of particles as defined above. In this embodiment the set may optionally locally contain particles which do not meet the required sphericity criteria as long as the numerical mean sphericity of all the particles meets the criteria set in this invention. Thus the term "set of spherical particles" refers to a plurality of particles in which at least 50% by number of the particles have a sphericity as defined above. Preferably at least 60%, at least 70%, at least 80%, at least 90%, at least 95% by number of the particles in the set in question have a sphericity as defined above.

The particles according to the invention are micrometresized, that is to say the diameter of the particles lies between 0.1 and 100 micrometres, in particular between 0.1 and 20 micrometres. In a preferred embodiment the mean diameter of the particles is between 0.3 and 10 micrometres or between 0.5 and 5 or else between 0.5 and 2 micrometres. Those skilled in the art will be aware of suitable techniques for determining the diameter of the particles or sets of particles according to the invention, and they will also be aware of the degree of uncertainty present in these measurements. For example, the mean diameter of the particles in a set, the standard deviation and the size distribution in particular can be determined by statistical investigations based on microscopy images, for example from scanning or transmission electron microscopy. More specifically particles having a mean diameter of 1.0 microns and a particle size distribution by number of 0.3 to 4 microns have been obtained.

In the case where the particles are part of a set, the above diameter values may correspond to the mean diameter of the particles by number, even if some of the particles in the set have diameters outside this range. Advantageously, all the particles in the population will have a diameter as defined above.

In one embodiment the standard deviation relating to particle size in a population of particles according to the invention is less than or equal to 50%, preferably less than or equal to 20%.

The particle size distribution within the set of particles according to the invention may be monomodal or multimodal.

Through the use of micrometre-sized spherical particles in the present invention it is possible to favour particle dispersion properties, because they are not too large (sedimentation is thus minimised) and to not have the disadvantages of nanoparticles (difficulties of use, toxicity, poor opacifying power, etc.). Furthermore, this makes it possible to have paints or inks of small thickness (for example less than 50 microns).

By particle, in this invention, is meant a particle whose three-dimensional system at least in part consists of an inorganic component, that is to say one that does not originate from carbon chemistry (apart from $CO_3^{2-}$). The chemical diversity of inorganic components is well known to those skilled in the art.

In a particular embodiment the particles according to the invention are dense.

By dense particles are meant particles having a small specific surface area, more specifically less than 15 $m^2/g$, preferably less than 5 $m^2/g$ (and more particularly between 0.01 and 5 $m^2/g$) and/or which have pores of small diameter, for example pores of diameter less than 5 nm (and more particularly between 0.1 and 5 nm). Pore size must be smaller than the size of the colourant in order to limit release of the colourant outside the particle. Measurements of pore diameters and specific surface areas may conventionally be determined by nitrogen porosimetry and the "BJH" method named after its authors Barett, Joyner and Halenda.

In a particular embodiment of the invention the particles have a low level of release. For example the level of colourant release may be less than or equal to 3%, preferably less than or equal to 2% by mass. This measure may in particular be obtained by measuring release by immersing the particles in a specific solvent and measuring the concentration of colourant not contained within the particles (i.e. released colourant) by UV-visible spectroscopy (using a calibration range of colourant placed in solution in the same solvent at different concentrations).

In a particular embodiment of the invention, because of their high sphericity coefficient, the particles according to the invention are not aggregated—each particle in the set is not attached to other particles by strong chemical bonds such as covalent bonds, which has the advantage that its particles can be more easily formulated in matrices.

The set of particles according to the invention may locally contain particles which do not fulfil this characteristic, as long as the criterion for non-aggregation is satisfied by at least 50% by number of the particles in the set. Preferably at least 60%, at least 70%, at least 80%, at least 90%, at least 95% by number of the particles in the set in question are not aggregated.

Preferably a particle in the set according to the invention does not consist of the aggregation of several particles of smaller size. This can be clearly displayed for example by microscopy investigations, particularly by scanning or transmission electron microscopy. This means that the particles according to the invention can only be constituted of domains of size markedly smaller than that of the particles according to the invention. A particle according to the invention is preferably formed of at least two domains. One domain consists of material having the same chemical nature and the same structure, which may be local or extended continuously within the particle. By way of comparison, the spraying techniques conventionally used in the art generally provide non-spherical aggregated particles. The objects formed by these aggregates of particles may be spherical.

In one embodiment the inorganic component comprises several chemical elements, preferably from 2 to 16 different chemical elements, this number of elements not taking into account the elements O and H which may be included in the inorganic component.

These then are inorganic components which may be heterogeneous, that is to say they comprise different elements, the stoichiometry of which is preferably controlled by the process of synthesis.

The heterogeneous inorganic components may either comprise several chemical elements (apart from O and H), preferably all the chemical elements (except O and H) constituting the inorganic component within the same domain, or comprise domains each formed of a single chemical element (apart from O and H). In one particular embodiment each domain of the heterogeneous inorganic component comprises a single chemical element (apart from O and H).

Of course the particles according to the invention may comprise a minimum proportion, for example less than or equal to 5% by mass, of contaminants which may be of a chemical nature different from that of the said particles.

In a preferred embodiment the inorganic components are silica, in particular amorphous silica, alumina, in particular amorphous or crystalline alumina, boehmite, zinc oxide, in particular hexagonal zinc oxide, which may be doped, for example doped with aluminium, titanium dioxide, in particular anatase or rutile, mixed titanium and silicon oxide, in particular anatase, montmorillonite, in particular monoclinic montmorillonite, hydrotalcite, in particular hexagonal hydrotalcite, magnesium dihydroxide, in particular hexagonal magnesium dihydroxide, magnesium oxide, in particular periclase, yttrium oxide, in particular cubic yttrium oxide, which may be doped with europium and/or erbium and/or ytterbium, cerium dioxide, calcium copper titanate, barium titanate, iron oxide, preferably in the form of haematite, or magnesium sulfate, preferably orthorhombic magnesium sulfate.

In a particular embodiment the particles according to the invention are made up of metal oxide, preferably alumina, in particular amorphous or crystalline alumina, boehmite, silicate, silica, in particular amorphous silica, or mullite.

In a preferred embodiment the inorganic components are silica or sodium silicate, in particular amorphous silica.

In a particular embodiment of the invention the three-dimensional system of which the particles are made up at least partly consists of a metal component, possibly an organic-inorganic hybrid. This component may be obtained by sol-gel means from at least one metal molecular precursor comprising one or more hydrolysable groups having the formulae (1), (2), (3) or (4) defined below.

The particles according to the invention comprise colourants. Mention is also made of particles charged with colourants. The colourants are organic compounds, which may be present in the form of salts. They are incorporated during preparation of the precursor solution.

A wide variety of colourants may be suited to this invention. Preferably the colourant is compatible with the medium of the precursor solution and/or is selected so that it does not degrade at the temperatures which have to be applied during the particle preparation process, which may generally be between 100 and 300° C.

The colourant may be selected according to the application of the invention and current regulations, such as the Food and Drug Administration's (FDA) list of colourants, in particular FD&C or D&C colourants.

The following colourants may be mentioned in particular: Brilliant blue (E133; C.I. 42090), tartrazine (E102, C.I. 18140), azorubine (E112; C.I. 14720), EXT. D&C Green No. 1 (C.I. 10020), EXT. D&C Yellow No. 7 (C.I. 10316), EXT. D&C Yellow No. 1 (C.I. 13065), EXT. D&C Orange No. 3 (C.I. 14600), FD&C Red No. 4 (C.I. 14700), D&C Orange No. 4 (C.I. 15510), FD&C Yellow No. 6 (C.I. 15985), D&C Red No. 2 (C.I. 16185), D&C Red No. 33 (C.I. 17200), EXT. D&C Yellow No. 3 (C.I. 18820), FD&C Yellow No. 5 (C.I. 19140), D&C Brown No. 1 (C.I. 20170), D&C Black No. 1 (C.I. 20470), FD&C Green No. 3 (C.I. 42053), FD&C Blue No. 1 (C.I. 42090), D&C Blue No. 4 (C.I. 42090), D&C Red No. 19 (C.I. 45170), D&C Red No.

37 (C.I 45170), EXT. D&C Red No. 3 (C.I. 45190), D&C Yellow No. 8 (C.I. 45350), D&C Orange No. 5 (C.I. 45370), D&C Red No. 21 (C.I. 45380), D&C Red No. 22 (C.I. 45380), D&C Red No. 28 (C.I. 45410), D&C Red No. 27 (C.I. 45410), D&C Orange No. 10 (C.I. 45425), D&C Orange No. 11 (C.I. 45425), FD&C Red No. 3 (C.I. 45430), D&C Yellow No. 11 (C.I. 47000), D&C Yellow No. 10 (C.I. 47005), D&C Green No. 8 (C.I. 59040), EXT. D&C Violet No. 2 (C.I. 60730), D&C Green No. 5 (C.I. 61570) or FD&C Blue No. 2 (C.I. 73015).

Mention may also be made of colourants of the "azoic acids" type, in particular such as those described in the Colour Index International, $3^{rd}$ edition, under the name ACID, such as for example: Disperse Red 17, Acid Yellow 9, Acid Black 1, Acid Yellow 36, Acid Orange 7, Acid Red 33, Acid Red 35, Acid Yellow 23, Acid Orange 24, Acid Violet 43, Acid Blue 62, Acid Blue 9, Acid Violet 49, Acid Blue 7.

Mention may also be made of colourants of natural origin, such as grape extracts, safflower extracts, cochineal extracts, beetroot extracts turmeric, riboflavin, xanthophyll, carotenoids, carmine, carminic acid, anthocyanins, chlorophylls, etc.

In the case of the present invention the colourant may be cationic, anionic, neutral, amphoteric, zwitterionic or amphiphilic.

Preferably the colourants are agents (or molecules) which are positively charged. Thus they are more compatible with negatively charged silica particles at acid pH, which encourages retention of the colourant within the particle.

The particles according to the invention may be loaded with one or more organic colourants. When there are several colourants in one particle, this may be a mixture of organic colourants, a mixture of inorganic colourants or a mixture of organic and inorganic colourants.

The encapsulation of organic colourants within particles according to the invention makes it possible to formulate these agents in any medium, whether hydrophilic or hydrophobic, and thus to render these organic agents fully compatible and therefore effective in matrices of different types. In this way the organic colourants can also be protected or stabilised when used in an aggressive medium. This may also make it possible to avoid problems of the undesired transfer of these colourants to substrates or materials other than those in which they are located.

The particles according to the invention have colourants whose quantity can vary widely, depending in particular on the size and nature of the particles. This quantity also depends on the desired level of colouring and the nature of the colourants used. For example the ratio of colourants may vary from 5 to 35%, preferably from 5 to 30%, and more particularly from 10 to 30% by mass in relation to the mass of the particles. For example, the quantity of colourants may be 15-25% by weight and the quantity of the particles may be 85-75% by weight.

As specified above, the process according to the invention makes it possible to obtain a higher concentration of colourants in the particles than conventional processes. Furthermore the process according to the invention has the advantage that there is little loss of the reagents used at the outset (high level of use of the reagents used), and in particular little loss of the colourants used.

It is also possible to add a post-treatment stage which comprises sealing the particles, in particular by chemical or thermal means, at least momentarily, with the object in particular of prolonging non-release of the colourant. Thus the particles according to the invention may have shells (or coatings), such as a silica-based shell, obtained from organosilanes by means of a sol-gel reaction. The shell may be permanent or temporary, and may possibly be degradable. The shell may therefore be removed by any means, in particular by using shells based on degradable polymers, or through the action of an external stimulus of the pH type (by dissolution), mechanical type (brittle shell), thermal type (shell which melts as a result of raised temperature) or optical type (shell disaggregating under irradiation).

Another object of the invention is a material comprising a set of particles according to the invention and a matrix. More specifically, the particles according to the invention are uniformly distributed within the said matrix.

According to the present invention the term matrix refers to any material which can advantageously benefit from the inclusion of particles according to the invention. It may in particular comprise solid or liquid matrices, regardless of the viscosity of the starting liquid matrix.

In one embodiment the matrix is a soft, rigid or solid matrix used as a coating, for example a ceramic or polymer matrix, in particular a polymer matrix of the paint, layers of sol-gel or varnish type, or a mixture thereof.

The material according to the invention may be intended for use in papermaking, paint, agri-food, cosmetics or pharmaceuticals. In one particular embodiment the material is an ink formulation, in particular one which can be used for writing or printing.

The inclusion of particles according to the invention in a matrix makes it possible to impart the colouring property to the matrix. Particles may be included within the matrix by the techniques conventionally used in the art, in particular by mechanical stirring when the matrix is liquid.

The material according to the invention may in particular be in the form of liquid, powder, beads, pellets, granulates, films or foam, the operations of shaping or preparing these materials being carried out by conventional techniques known to those skilled in the art.

In particular, in comparison with the shaping process conventionally used for matrices without the inclusion of particles, the process for shaping or preparing the material does not require an additional stage of dispersing the particles within the matrix. The shaping process may preferably be performed in processing equipment and systems conventionally used for matrices without the inclusion of particles. In some embodiments particles may be dispersed within the matrix without an additional chemical dispersant.

In one particular embodiment the particles are dispersed within the matrix in the presence of a chemical dispersant such as a surfactant. Those skilled in the art will be able to determine whether the use of a dispersant is necessary in order to obtain the dispersion sought for and to adapt the quantity of dispersant which has to be used, as appropriate. For example, the dispersant may be used in a quantity from 0.1 to 50% by mass in relation to the mass of particles, in particular in a quantity from 0.5 to 20% by mass in relation to the mass of particles.

The particles according to the invention have the special feature that they disperse substantially uniformly by volume within the matrix, regardless of their chemical nature, their morphology and the nature of the matrix. This means that the particle density per unit volume is the same at all points within the matrix.

In the case of a solid matrix, the particle density per unit surface area is preferably the same regardless of the surface of the matrix in question, whether an extremity surface of the matrix or a "core" surface obtained for example by cutting the material. Thus the colouring property imparted to the matrix through the inclusion of particles according to the invention is substantially uniformly distributed throughout all the volume of the matrix.

The material according to the invention may comprise particles according to the invention in any suitable proportion to impart the desired properties to it, and in particular the desired colouring. For example, the material may comprise from 0.1 to 80% by mass of particles in relation to the total mass of matrix+particles, preferably from 1 to 60% by mass, in particular from 2 to 50% by mass.

Preferably the particles according to the invention are non-deformable spherical particles. Thus the surface area of each particle in contact with other particles is very small. In one embodiment the radius of curvature of the meniscus forming the contact between two different particles in the set is less than 5%, preferably less than 2%, of the radius of each of the two particles, in particular within a matrix or in the form of powder.

With the sphericity of the particles according to the invention it is also possible to obtain a lower viscosity than with non-spherical particles, for the same level of charge in a liquid matrix.

Another object of the present invention is a process for preparing a set of particles according to the invention. The process according to the invention is a process known as "aerosol pyrolysis" (or spray pyrolysis) which is performed at drying temperatures and not at pyrolysis temperatures. This process is an improved process in comparison with the aerosol pyrolysis described in particular in application FR 2 973 260. More specifically, the process according to the invention is generally performed in a reactor.

This process comprises the following non-dissociable and continuous stages in the same reactor:

(1) spraying a liquid solution containing one or more precursors of the three-dimensional network of the particles, in a given molar concentration in a solvent into a reactor so as to obtain a mist of droplets of solution, the liquid solution further comprising at least one colourant as defined above, (2) heating the mist obtained in stage (1) to a temperature known as the drying temperature, capable of ensuring evaporation of the solvent and volatile compounds and formation of particles, (3) heating the particles so formed to a temperature (known as the pyrolysis temperature), capable of ensuring conversion of the precursor or precursors to form the inorganic part of the said system, (4) optionally densification of the particles from stage (3), and (5) recovery of the particles so formed.

Spraying stage (1) is preferably carried out at a temperature of 10 to 40° C., and/or preferably during a time of 10 seconds or less, in particular 5 seconds or less. In stage (1) the liquid solution is generally in the form of an aqueous or water-alcohol solution or in the form of a colloidal sol. More specifically, the liquid solution of stage (1) is inserted into a reactor by spraying.

Heating (drying) stage (2) is preferably carried out at a temperature of 40 to 120° C., and/or preferably during a time of 10 seconds or less, in particular between 1 and 10 seconds.

Stage (3), known as the pyrolysis stage, is preferably carried out at a temperature of 120 to 300° C., and/or preferably during a time of 30 seconds or less, in particular between 10 and 30 seconds.

Optional densification or consolidation stage (4) may be carried out over a wide range of temperatures, in particular between 200 and 600° C. This stage is preferably carried out at a temperature of 200 to 400° C. when the particles which it is desired to prepare are at least partly in crystallised form. When it is desired to obtain dense but not crystallised particles, in particular amorphous particles, the "densification" temperature may be lower, for example it may be around 200° C. to 300° C., particularly in the case of amorphous silica. Preferably the densification stage is carried out during a time of 30 seconds or less, in particular between 20 and 30 seconds.

Recovery stage (5) is preferably carried out at a temperature below 100° C., and/or preferably during a time of 10 seconds or less, in particular 5 seconds or less. Particle recovery stage (5) is preferably carried out by depositing the particles on a filter when leaving the reactor.

The advantage of the process according to the invention is that it may be carried out in a relatively short time. The duration of the process using the successive stages specified above may for example be less than a few minutes (for example 2 or 3 minutes, or even one minute).

The temperatures of each of the stages may lie outside the temperature ranges provided above. In fact, for the same particles, the temperature that has to be applied may depend on the speed at which the droplets and then the particles circulate within the reactor. The faster the droplets and subsequently the particles travel within the reactor, the higher the set temperature must be in order to achieve the same result. Of course the maximum temperature applied in the reactor will depend on the colourant selected, so that it is not degraded.

Preferably, stages (2), (3) and possibly (4) are carried out in the same reactor.

All the stages in the process, in particular stages (2), (3) and possibly (4), are carried out with continuity from one to another. The temperature profile applied within the reactor is adapted depending on the particles which it is desired to form so that these two or three stages take place one after another. Preferably, the temperature within the reactor is adjusted through at least one, preferably 2 or 3, heating elements whose temperatures can be determined independently.

Preferably the temperatures in sequential stages (2), (3) and possibly (4) are increasing temperatures.

The process according to the present invention preferably further comprises a stage (4') of quenching the particles between stage (3), or possibly the stage of densification of the particles (4) where this is used, and the stage of recovering the particles (5). Quenching stage (4') is preferably performed by causing a cold gas, preferably air, to enter over all or part of the circumference of the reactor. A gas is said to be cold in the present invention if it is at a temperature of between 15 and 50° C., preferably between 15 and 30° C. In one embodiment the gas entering the reactor is a gas other than air. In particular it may be a neutral gas (such as nitrogen or argon), a reducing gas (such as hydrogen or carbon monoxide), or any mixture of such gases.

The process is preferably performed in the absence of a gas flow vectorising the mist from the bottom of the reactor. Laminar flow making it possible to draw the material into the zone in which the temperature is higher is advantageously created only by suction at the top of the reactor, producing a negative pressure, for example of the order of several pascals or several tens of pascals.

Such an embodiment allows a reactor to be used without a gas inlet in its lower part, thus limiting disturbances in the process and losses, and thus optimising the yield of the process and the size distribution of the particles obtained.

In another embodiment the reactor in which the process is performed also comprises a gas inlet at the level where the mist is formed. The gas entering the reactor at this level is preferably air.

Preferably, the process according to the invention does not incorporate any heating stage other than those used within the aerosol pyrolysis reactor.

Because of the ability of the process according to the invention to be fast, and the possible existence of a quenching stage at the end of the process of preparing the particles according to the invention, the latter may comprise any chemical constituent which can be densified, in particular crystallised, even metastable phases. In fact, through the particular conditions used in the process, compounds whose degradation temperature is below the temperature effectively applied can be preserved, because the time spent at high temperature is very short. In this context the term "high temperature" preferably indicates a temperature of over 40° C. The "time spent at high temperature" generally indicates the time spent in the stages of drying, pyrolysis and densification. Preferably the time spent at high temperature does not exceed 70 seconds, in particular it lies between 30 and 70 seconds. Preferably quenching is characterised by a cooling rate of 100° C. per second or more.

Those skilled in the art will be capable of adjusting the temperature and time spent in each of these stages depending on the compounds added in stage (1).

Figure 2:
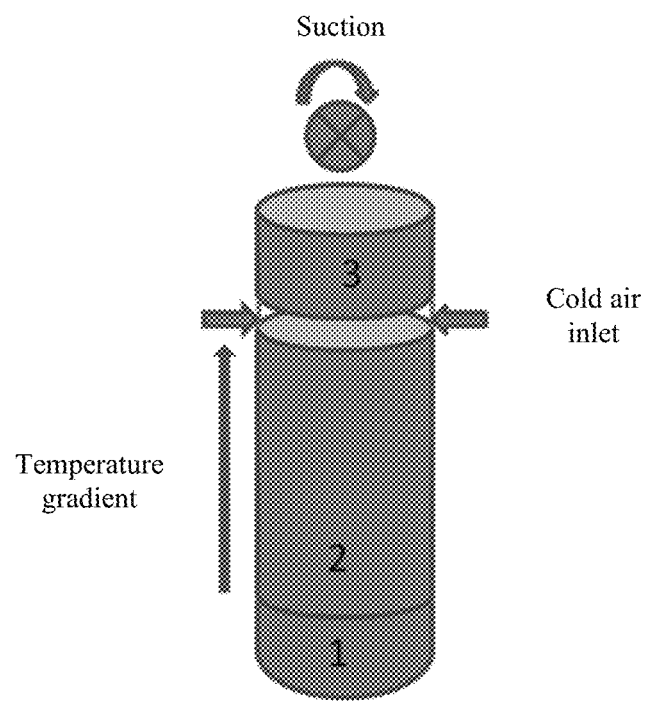
FIG. 2: Diagrammatical illustration of an appropriate reactor for implementing the process according to the invention.

FIG. 2 shows an example of a diagram of a reactor for implementing the process according to the invention. The lower part (1) of the reactor contains the liquid solution containing a precursor or precursors of the three-dimensional system at a given molar concentration in a solvent. This solution is sprayed at the intermediate part (2) and the droplets rise within the reactor through suction. The entry of cold gas, in particular cold air, allows the particles to be quenched. The upper part (3) of the reactor is also at a cold temperature (below 100° C., for example between 15 and 50° C.).

The precursor or precursors of the three-dimensional system of the particles may be of any origin, they are added in stage (1) of the process in the form of a liquid solution, in particular an aqueous or water-alcohol solution containing metal ions (such as an organic or mineral salt of the metal in question) or precursor molecules (such as organosilanes) or else in the form of a colloidal sol (such as a colloidal dispersion of nanoparticles of the metal or metal oxide in question). The precursor or precursors of the three-dimensional system is or are selected depending on the particles which it is desired to form.

In a particular embodiment, this precursor at least partly originates from plant or food waste, representing bio sources. As examples of such precursors of inorganic material, mention may in particular be made of the sodium silicate obtained from rice husks.

As specified previously, according to one particular embodiment of the invention the three-dimensional system of which the particles are composed consists at least in part of a metal component, which may be an organic-inorganic hybrid. This component may be obtained by sol-gel means from at least one molecular metal precursor comprising one or more hydrolysable groups of formula (1), (2), (3) or (4).

By hydrolysable group is meant a group capable of reacting with water to yield an —OH group, which will itself undergo a polycondensation.

The said molecular metal precursor or precursors comprising one or more hydrolysable groups are selected from a metal alkoxide or halide, preferably a metal alkoxide, or a metal alkynyl, having the following formula (1), (2), (3) or (4):

$$MZ_n \quad (1),$$

$$L^m{}_xMZ_{n-mx} \quad (2),$$

$$R'_xSiZ_{4-x'} \quad (3), \text{ or}$$

$$Z_3Si-R''-SiZ_3 \quad (4)$$

formulae (1), (2), (3) and (4) in which:

M represents Si(IV), the figure in the brackets being the valency of the M atom;

n represents the valency of the M atom;

x is an integer from 1 to n−1;

x' is an integer from 1 to 3;

each Z, independently of each other, is selected from a halogen atom and an —OR group, and Z is preferably an —OR group;

R represents an alkyl group preferably containing 1 to 4 carbon atoms, such as a methyl, ethyl, n-propyl, i-propyl, n-butyl, s-butyl or t-butyl group, preferably methyl, ethyl or i-propyl, even better ethyl;

each R' represents, independently of each other, a non-hydrolysable group selected from alkyl groups, in particular $C_{1-4}$ alkyl groups, for example methyl, ethyl, propyl or butyl; alkenyl groups, in particular $C_{2-4}$ alkenyl groups, such as vinyl, 1-propenyl, 2-propenyl and butenyl; alkynyl groups, in particular $C_{2-4}$ alkynyl groups, such as acetylenyl and propargyl; aryl groups, in particular $C_{6-10}$ aryl groups, such as phenyl and naphthyl; methacryl or methacryloxy ($C_{1-10}$ alkyl) groups such as methacryloxy propyl; epoxyalkyl or epoxyalkoxyalkyl groups in which the alkyl group is $C_{1-10}$ linear, branched or cyclic, and the alkoxy group comprises 1 to 10 carbon atoms, such as glycidyl and glycidyloxy ($C_{1-10}$ alkyl) groups; $C_{2-10}$ halogenoalkyl groups such as 3-chloropropyl; $C_{2-10}$ perhalogenoalkyl groups such as perfluoropropyl; $C_{2-10}$ mercaptoalkyl groups such as mercaptopropyl; $C_{2-10}$ aminoalkyl groups such as 3-aminopropyl; ($C_{2-10}$ aminoalkyl) amino ($C_{2-10}$ alkyl) groups such as 3-[(2-aminoethyl)amino]propyl; di($C_{2-10}$ alkylene) triamino($C_{2-10}$ alkyl) groups such as 3-[diethylenetriamino]propyl and imidazolyl-($C_{2-10}$ alkyl) groups; L represents a monodentate or polydentate, preferably polydentate, complexing ligand, for example a preferably $C_{1-18}$ carboxylic acid such as acetic acid, a preferably $C_{5-20}$ β-diketone, such as acetylacetone, a preferably $C_{5-20}$ β-ketoester such as methylacetoacetate, a preferably $C_{5-20}$ β-ketoamide such as an N-methylacetoacetamide, a preferably $C_{3-20}$ α- or β-hydroxy acid such as lactic acid or salicylic acid, an amino acid such as alanine, a polyamine such as diethylene triamine (or DETA), or a phosphonic acid or a phosphonate;

m represents the hydroxylation index of the ligand L; and

R" represents a non-hydrolysable functional group selected from preferably $C_{1-12}$ alkylene groups, for example methylene, ethylene, propylene, butylene, hexylene, octylene, decylene and dodecylene; preferably $C_{2-12}$ alkynylene groups, for example acetylenylene (—C≡C—), —C≡C—C≡C—, and —C≡C—$C_6H_4$—C≡C—; N,N-di($C_{2-10}$ alkylene) amino groups such as N,N-diethyleneamino; bis[N,N-di($C_{2-10}$ alkylene)amino] groups such as bis[N-(3-propylene)-N-methyleneamino]; $C_{2-10}$ mercaptoalkylenes such as mercaptopropylene; ($C_{2-10}$ alkylene) polysulfide groups such as propylene-disulfide or propylene-tetrasulfide; in particular $C_{2-4}$ alkynylene groups such as vinylene;

in particular $C_{6-10}$ arylene groups such as phenylene; di($C_{2-10}$ alkylene) $C_{6-10}$ arylene groups such as di(ethylene) phenylene; N,N'-di($C_{2-10}$ alkylene) ureido groups such as N,N'-dipropyleneureido; and the following groups:

groups of thiophene type such as

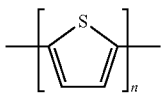

with n=1-4, groups of $C_{2-50}$ aliphatic and aryl (poly)ether or (poly)thioether type such as —$(CH_2)_p$—X—$(CH_2)_p$—, —$(CH_2)_p$—$C_6H_4$—X—$C_6H_4$—$(CH_2)_p$—, —$C_6H_4$—X—$C_6H_4$—, and $[(CH_2)_p$—X$]_q(CH_2)_p$—, with X representing O or S, p=1-4 and q=2-10, groups of crown ether type such as

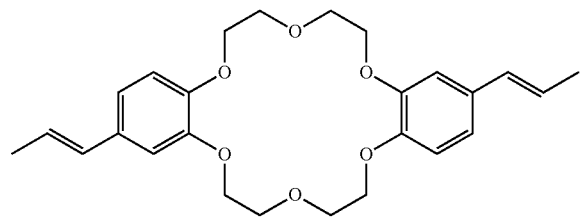 [SMILES: C/C=C/c1ccc2c(c1)OCCOCCOc1ccc(/C=C/C)cc1OCCOCCO2]

groups of organosilane type such as:
—$CH_2CH_2$—$SiMe_2$-$C_6H_4$—$SiMe_2$-$CH_2CH_2$—,
—$CH_2CH_2$—$SiMe_2$-$C_6H_4$—O—$C_6H_4$—$SiMe_2$-$CH_2CH_2$— and
—$CH_2CH_2$—$SiMe_2$-$C_2H_4$—$SiMe_2$-$CH_2CH_2$—,

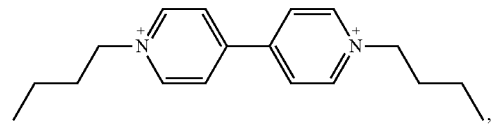

or else groups of trans-1,2-bis(4-pyridylpropyl)ethene type

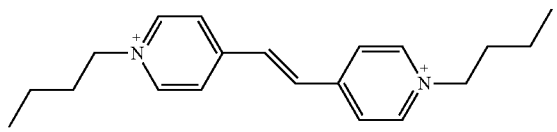

By way of examples of organoalkoxysilanes of formula (3) mention may be made in particular of 3-aminopropyltrialkoxysilane $(RO)_3Si$—$(CH_2)_3$—$NH_2$, 3-(2-aminoethyl)aminopropyltrialkoxysilane $(RO)_3Si$—$(CH_2)_3$—NH—$(CH_2)_2$—$NH_2$, 3-(trialkoxysilyl)propyldiethylenetriamine $(RO)_3Si$—$(CH_2)_3$—NH—$(CH_2)_2$—NH—$(CH_2)_2$—$NH_2$; organosilyl azoles of the N-(3-trialkoxysilylpropyl)-4,5-dihydroimidazole type, R having the same meaning as above.

As examples of bis-alkoxysilanes of formula (4), use is preferably made of a bis[trialkoxysilyl] methane $(RO)_3Si$—$CH_2$—$Si(OR)_3$, a bis[trialkoxysilyl] ethane $(RO)_3Si$—$(CH_2)_2$—$Si(OR)_3$, a bis[trialkoxysilyl] octane $(RO)_3Si$—$(CH_2)_8$—$Si(OR)_3$, a bis[trialkoxysilylpropyl] amine $(RO)_3Si$—$(CH_2)_3$—NH—$(CH_2)_3$—$Si(OR)_3$, a bis[trialkoxysilylpropyl] ethylenediamine $(RO)_3Si$—$(CH_2)_3$—NH—$(CH_2)_2$—NH—$(CH_2)_3$—$Si(OR)_3$; a bis[trialkoxysilylpropyl] disulfide $(RO)_3Si$—$(CH_2)_3S_2$—$(CH_2)_3$—$Si(OR)_3$, a bis[trialkoxysilylpropyl] tetrasulfide $(RO)_3Si$—$(CH_2)_3$—$S_4$—$(CH_2)_3$—$Si(OR)_3$, a bis[trialkoxysilylpropyl] urea $(RO)_3Si$—$(CH_2)_3$—NH—CO—NH—$(CH_2)_3$—$Si(OR)_3$; a bis[trialkoxysilylethyl] phenyl $(RO)_3Si$—$(CH_2)_2$—$C_6H_4$—$(CH_2)_2$—$Si(OR)_3$, R having the same meaning as above.

In the case of the present invention, by organic-inorganic hybrid is meant a system consisting of molecules corresponding to formulae (2), (3) or (4).

The colourants may be placed in the liquid solution in stage (1) in either dry form or in the form of a liquid solution. When the colourants are nanoparticles they may be added to the liquid solution of stage (1) in the form of an aqueous or water-alcohol suspension comprising nanoparticles or else in dry form to be dispersed in the liquid solution of stage (1) of the process according to the invention. When the colourants are salts, they may be added to the liquid solution of stage (1) in dry form or in a form dissolved in an aqueous or water-alcohol solution.

As specified above, the quantity of colourants added during the process according to the invention may vary widely, this quantity depending in particular on the size and nature of the particles desired. This quantity also depends on the level of colouring desired and the nature of the colourants used. Thus the process according to the invention allows a higher level of colourants in the particles to be obtained than conventional processes. Furthermore, the process according to the invention has the advantage of having little loss of the reagents used at the outset (high level of use of the reagents used), and in particular little loss of the colourants used. More specifically, at least the quantity of colourants added may be substantially the same as that desired in the particles obtained. For example, the quantity of colourants added in the process according to the invention, and in particular in stage (1), may be from 0 to 20% greater than the quantity finally obtained in the particles of the invention.

According to a particular embodiment of the invention the quantity of organic colourants introduced in stage (1) of the process according to the invention is such that the quantity of colourants present in the particles of the invention is from 5 to 35%, preferably from 5 to 30%, and more particularly from 10 to 30% by weight with respect to the weight of the particles obtained.

Through the process according to the invention it is possible to obtain particles having a high level of purity. These particles do not necessarily require the use of further processing stages, such as washing, heat treatment, grinding, etc., prior to their use.

In the process according to the invention components, other than the colourant, added to and used in the reactor are converted, which is an important advantage, as the process generates little waste. Furthermore the level at which the atoms are used is high and consistent with the requirements of green chemistry.

The process according to the invention may possibly comprise at least one stage of post-treatment of the particles. For example this may be a stage of washing with a suitable solvent, a stage of heating the particles, and/or a stage of coating the particles, in particular to "seal" the said particles, as described above.

In particular, a stage of post-treatment by heating of the particles may be needed to optimise the particle properties, such as their composition or crystalline structure. A stage of post-treatment by heating of the particles will generally become less necessary the lower the speed of the droplets and then the particles in the reactor.

With the process according to the invention the size of the particles when leaving the process can be controlled precisely. In fact there is a constant ratio, of around 5, between the diameter of the drops of mist used and the diameter of the particles when leaving the process. Those skilled in the art will know how to determine the ratio between these two diameters depending on the precursor concentration. For example, if the precursor concentration is reduced by a factor of 10, then the size of the particles obtained will be reduced by a factor which is the cube root of 10, that is approximately 3. The diameter of the drops may also in particular be controlled by the parameters of the mode of spraying, for example the frequency of the piezoelectric elements used to form the mist.

Through the process according to the invention it is also possible to precisely control the size of the pores leaving the process. Pore size is controlled by the choice of precursor compounds in the solution, their concentrations, the pH and the presence of the colourants. In the present invention pore size and specific surface area will advantageously be limited for values below 5 $m^2/g$.

Another object of the invention is a set of particles which can be prepared according to the process described above. Particles so prepared have the characteristics described above. Through this process spherical particles and in particular particles without aggregates can be obtained. Preferably it also makes it possible that each particle will not be constituted by the aggregation of several particles of smaller size.

A final object of the invention is a process for preparing a material according to the invention comprising contacting a matrix as defined above with at least one set of particles according to the invention. This process then preferably comprises a stage of shaping the material as described above.

Unless specified otherwise, the percentages mentioned in the present invention are percentages by mass. The terms "mass" and "weight" are here used interchangeably.

The following examples are provided by way of non-limiting illustration of the invention.

EXAMPLES

Example 1: Process for Particle Synthesis

Preparation of the solution: The following compounds were added to a beaker in the order given, with magnetic stirring: 70.7 g of an aqueous solution of acetic acid, 14 g of TEOS (that is 4.04 g of silica, 75% of the particles obtained) with 14.0 g of ethanol. The solution was then stirred for at least 1 hour to enable hydrolysis-condensation of the TEOS. A mass of 1.35 g of organic colourant (25% of the particles obtained) was added to the sol.

The precursor solution was nebulised by the pyrolysis spray process according to the invention in stage (1).

In stages (2) and (3) the maximum temperature of the oven in which the drying and pyrolysis stages were performed was set to 250° C. in order to preserve the colourant.

The particles were recovered directly on the filter in stage (5) and if necessary dried in air.

The particles were spherical and had a mean diameter of 1.0 micron, with a particle size distribution by number of 0.3 to 4 microns (scanning electron microscope) and a sphericity of 0.9, calculated from the microscopy images. The specific BJH surface area was 1.8 $m^2/g$, and a pore diameter 2.4 nm.

Example 2: Particles of Example 1 with a Surface Coating or Shell of Silica

A mass of 15.6 g of the particles of Example 1 was dispersed in 80.6 g of a water-alcohol solution and 0.4 g of ammonia by magnetic stirring. A mass of 3.4 g of TEOS was added progressively. Ageing of at least 1 hour was needed for hydrolysis condensation of the TEOS.

The particles were separated by centrifuging then dried to consolidate the silica layer. The particles were spherical and had a mean diameter of 1.0±0.5 microns, with a particle size distribution by number of 0.3 to 4 microns (scanning electron microscope) and a sphericity of 0.9, calculated from the microscopy images.

FIG. 1 shows a scanning electron microscope image of the particles of Example 2. The particles are indeed not aggregated.

Example 3: Release Test

A mass of 0.25 g of microparticles of Example 2 (with 24% of colourant) was dispersed in ethanol at a concentration of 20 g/L of microparticles. The solution was centrifuged. The sediments were dried and the supernatant was analysed by UV-visible spectrometry. The supernatant contained 0.1 g/L of colourant, that is a release of 2% by mass.

The invention claimed is:

1. A set of dense, spherical and micrometer-sized inorganic particles having a specific surface area of less than 15 $m^2/g$, where organic colorants in the amounts of between 5 and 30% by mass relative to the mass of said particles are incorporated in said particles, wherein at least 70% of the particles in the set have a sphericity coefficient of 0.85 or more, and at least 80% of the particles in the set have a spherical coefficient of 0.75 or more, and wherein at least 90% of the number of particles in the set are non-aggregative.

2. The set of claim 1, wherein the particles have a diameter of between 0.3 and 10 micrometers.

3. The set of claim 1, which particles have three-dimensional system comprising at least in part a metal oxide.

4. The set of claim 3, wherein said metal oxide comprises alumina, boehmite, silicate, silica or mullite.

5. The set of claim 4, wherein said metal oxide is alumina, and which is amorphous or crystalline alumina.

6. The set of claim 4, wherein said metal oxide is silica, and which is amorphous silica.

7. A material, comprising the set of the inorganic particles of claim 1, and a matrix.

8. The material of claim 7, wherein the matrix is a polymer matrix of paint, layers of sol-gel or varnish or a mixture thereof.

9. A method of coloring a substance, which comprises incorporating the material of claim 7 thereinto.

10. The method of claim 9, wherein the substance is an ink.

11. The method of claim 9, wherein the substance is a paint.

12. The method of claim 9, wherein the substance is an agri-food.

13. The method of claim 9, wherein the substance is a cosmetic.

14. The method of claim 9, wherein the substance is a pharmaceutical.

15. The set of claim 1, wherein the particles have a specific surface area of less than 5 $m^2/g$.

16. The set of claim 1, wherein the particles have pores of less than 5 nm in diameter.

17. The set of claim 1, wherein the particles are obtained by a process comprising the following non-dissociable and continuous steps in the same reactor:
1) spraying, at a temperature of 10 to 40° C., a liquid solution containing one or more precursors of a three dimensional system of the particles in a given concentration in a solvent into a reactor so as to obtain a mist of droplets of the liquid solution, the liquid solution further comprising at least one colorant;
2) heating the mist to a temperature known as the drying temperature, capable of ensuring evaporation of the solvent and formation of particles, said temperature being of 40 to 120° C.;
3) heating the formed particles to a temperature known as the pyrolysis temperature, capable of ensuring conversion of precursor or precursors to form the inorganic part of said system, said temperature being of 120 to 300° C.;
4) optionally densifying the particles; and
5) recovering the particles so formed.

* * * * *